(12) United States Patent
Shim et al.

(10) Patent No.: US 11,237,024 B2
(45) Date of Patent: Feb. 1, 2022

(54) OPTICAL ENCODER WITH COVERED PHOTO DIODE

(71) Applicant: PixArt Imaging Inc., Hsin-Chu County (TW)

(72) Inventors: Kuan-Choong Shim, Penang (MY); Gim-Eng Chew, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 140 days.

(21) Appl. No.: 16/583,972

(22) Filed: Sep. 26, 2019

(65) Prior Publication Data
US 2020/0109968 A1      Apr. 9, 2020

Related U.S. Application Data

(60) Provisional application No. 62/742,498, filed on Oct. 8, 2018.

(51) Int. Cl.
*G01D 5/347*       (2006.01)

(52) U.S. Cl.
CPC ....... *G01D 5/3473* (2013.01); *G01D 5/34707* (2013.01)

(58) Field of Classification Search
CPC ............. G01D 5/3473; G01D 5/34707; G01D 5/34715
See application file for complete search history.

(56) References Cited

U.S. PATENT DOCUMENTS

| | | | |
|---|---|---|---|
| 5,991,249 A * | 11/1999 | Lee ...................... | G11B 21/083 369/112.24 |
| 2006/0102832 A1 * | 5/2006 | Tanaka ............... | G01D 5/34715 250/231.13 |

* cited by examiner

*Primary Examiner* — Jennifer D Bennett
(74) *Attorney, Agent, or Firm* — Hauptman Ham, LLP

(57) ABSTRACT

There is provided an optical encoder including a photodiode array and a code disk opposite to each other. The photodiode array includes at least three sets of position photodiodes and two index photodiodes arranged transversally. The two index photodiodes are adjacently arranged at the same side of the at least three sets of position photodiodes. A first set of position photodiodes and a last set of position photodiodes of the at least three sets of position photodiodes are partially covered to alleviate the total harmonic distortion. The rest position photodiodes of the at least three sets of position photodiodes other than the first and last sets of position photodiodes are not covered.

17 Claims, 11 Drawing Sheets

OPTICAL ENCODER WITH COVERED PHOTO DIODE

RELATED APPLICATIONS

The present application claims the priority benefit of U.S. Provisional Application Ser. No. 62/742,498, filed Oct. 8, 2018, the disclosure of which is hereby incorporated by reference herein in its entirety.

BACKGROUND

1. Field of the Disclosure

This disclosure generally relates to an optical encoder and, more particularly, to an optical encoder and the photodiode array arrangement thereof that alleviate the total harmonic distortion and optical magnification mismatch.

2. Description of the Related Art

The optical rotation encoder can be adapted to detect an absolute position or a relative position of unlimited rotating shaft such as in an optical mouse or a printer.

The optical rotation encoder includes a code disk and a photodiode array. The photodiode array receives modulated light from the code disk to output differential quadrature signals having 90 degrees phase shift from one another. However, said differential quadrature signals have total harmonic distortion and said phase shift may not be exactly identical to 90 degrees. In addition, in the case that employs differential index to confirm the absolute position, error index signal can be generated due to the optical magnification mismatch.

Accordingly, the optical encoder that can alleviate or even eliminate the optical magnification mismatch and the total harmonic distortion in differential quadrature signals is necessary.

SUMMARY

The present disclosure provides an optical encoder having multiple sets of position photodiodes and one set of index photodiodes arranged adjacent to each other to form a photodiode array extending in a first direction. The total harmonic distortion is alleviated by partially covering two sets of position photodiodes at two ends of the photodiode array.

The present disclosure further provides an optical encoder having multiple sets of position photodiodes and one set of index photodiodes arranged adjacent to each other that alleviates the influence caused by optical magnification mismatch by partially covering one of the index photodiodes.

The present disclosure provides an optical encoder including a photodiode array and an opaque layer. The photodiode array includes at least three sets of position photodiodes arranged adjacently to one another along a first direction. Each set of position photodiodes has a first photodiode, a second photodiode, a third photodiode and a fourth photodiode arranged sequentially along the first direction. The at least three sets of position photodiodes include a first set of position photodiodes and a last set of position photodiodes respectively at two ends of the at least three sets of position photodiodes. The opaque layer covers upon the first set of position photodiodes and the last set of position photodiodes. A coverage of the first photodiode, the second photodiode, the third photodiode and the fourth photodiode of the first set of position photodiodes by the opaque layer is sequentially decreased. A coverage of the first photodiode, the second photodiode, the third photodiode and the fourth photodiode of the last set of position photodiodes by the opaque layer is sequentially increased.

The present disclosure further provides an optical encoder including a photodiode array, a first index photodiode, a second index photodiode and an opaque layer. The photodiode array includes at least three sets of position photodiodes arranged adjacently to one another along a first direction. Each set of position photodiodes has a first photodiode, a second photodiode, a third photodiode and a fourth photodiode arranged sequentially along the first direction. The first index photodiode is adjacently arranged at one of two ends of the at least three sets of position photodiodes along the first direction. The second index photodiode is arranged adjacent to the first index photodiode in the first direction. The opaque layer partially covers upon the second index photodiode and extends from one of two edges in the first direction to a center thereof.

The present disclosure provides an optical encoder including a photodiode array, a first index photodiode, a second index photodiode and an opaque layer. The photodiode array includes at least three sets of position photodiodes arranged adjacently to one another along a first direction. Each set of position photodiodes has a first photodiode, a second photodiode, a third photodiode and a fourth photodiode arranged sequentially along the first direction. The at least three sets of position photodiodes include a first set of position photodiodes and a last set of position photodiodes respectively at two ends of the at least three sets of position photodiodes. The first index photodiode is adjacently arranged at one of the two ends of the at least three sets of position photodiodes along the first direction. The second index photodiode is arranged adjacent to the first index photodiode in the first direction. The opaque layer covers upon the first set of position photodiodes and the last set of position photodiodes, and partially covers upon the second index photodiode and extends from one of two edges in the first direction to a center thereof. A coverage of the first photodiode, the second photodiode, the third photodiode and the fourth photodiode of the first set of position photodiodes by the opaque layer is sequentially decreased. A coverage of the first photodiode, the second photodiode, the third photodiode and the fourth photodiode of the last set of position photodiodes by the opaque layer is sequentially increased.

The present disclosure further provides an optical encoder including a photodiode array and an opaque layer. The photodiode array includes a first set of photodiodes, a second set of photodiodes and a third set of photodiodes arranged adjacently to one another along a first direction. Each set of photodiodes has a first photodiode, a second photodiode, a third photodiode and a fourth photodiode arranged along the first direction. The opaque layer covers upon the first set of photodiodes and the third set of photodiodes. A coverage of the first set of photodiodes by the opaque layer is sequentially decreased along the first direction. A coverage of the third set of photodiodes by the opaque layer is sequentially increased along the first direction.

In the embodiment of the present disclosure, opaque layers upon the first set of position photodiodes and the last set of position photodiodes are mirror-symmetric or asymmetric to each other.

BRIEF DESCRIPTION OF THE DRAWINGS

Other objects, advantages, and novel features of the present disclosure will become more apparent from the following detailed description when taken in conjunction with the accompanying drawings.

FIG. 1 is a schematic diagram of an optical encoder according to one embodiment of the present disclosure.

DETAILED DESCRIPTION OF THE EMBODIMENT

It should be noted that, wherever possible, the same reference numbers will be used throughout the drawings to refer to the same or like parts.

The present disclosure provides an optical encoder that alleviates the total harmonic distortion and the influence of optical magnification mismatch by covering or blocking a part of photodiode array. The present disclosure is applicable to both the transmission-type optical encoder and the reflection-type optical encoder.

Figure 1:
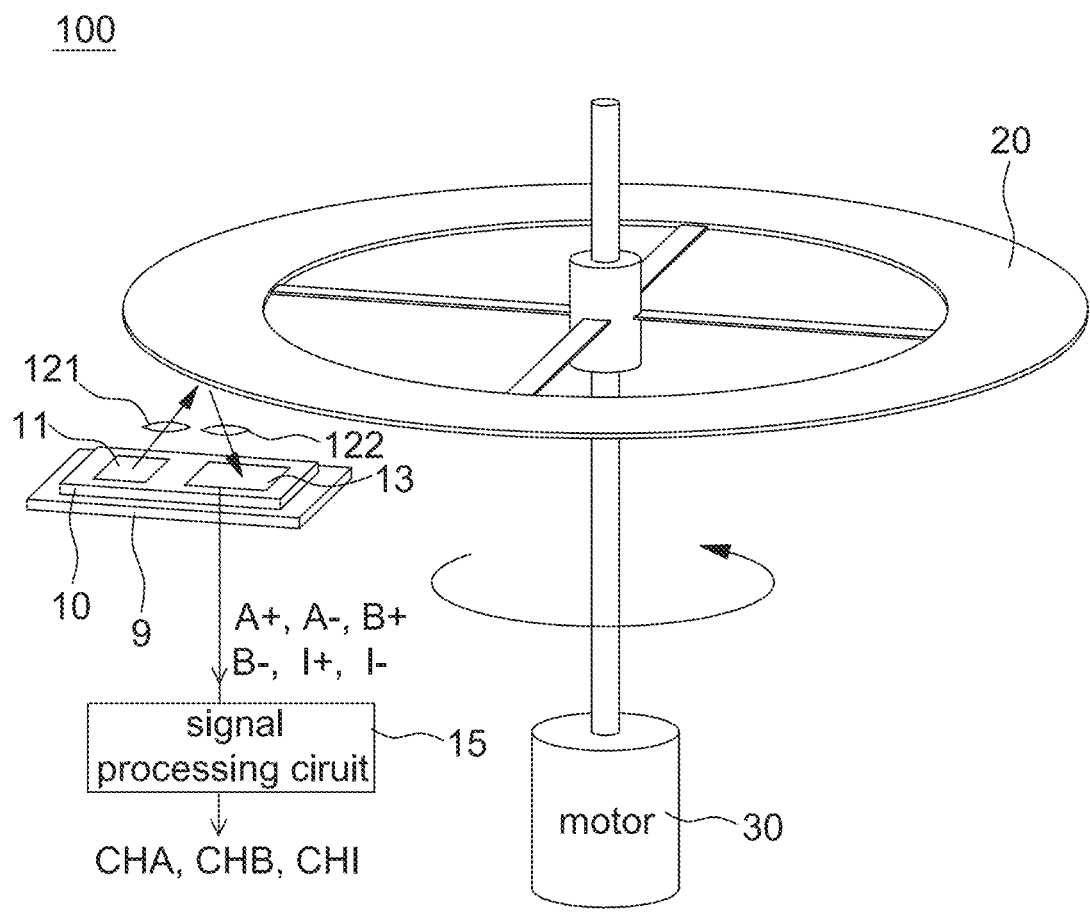

Referring to FIG. 1, it is a schematic diagram of an optical encoder 100 according to one embodiment of the present disclosure. The optical encoder 100 includes a sensing chip 10 arranged on a substrate 9 and a code disk 20 corresponding to the sensing chip 10, wherein a plurality of code slits, including position slits (e.g., shown as AB Slit in FIG. 2) and an index slit (e.g., shown as Index Slit in FIG. 2), are formed on the code disk 20. FIG. 1 shows that the code disk 20 is controlled by a motor 30 to rotate clockwise or counter clockwise, but the present disclosure is not limited thereto. According to different applications, the code disk 20 is implemented as a code stripe that has linear movement with respect to the sensing chip 10.

The sensing chip 10 includes a light source 11 and a photodiode array 13. The light source 11 is, for example, a light emitting diode or a laser diode, and used to emit light of an identifiable spectrum (e.g., infrared light, but not limited to) to illuminate the code slits on the code disk 20 via a lens 121. In the reflection-type optical encoder, the code slits modulate incident light to generate reflected light propagating to the photodiode array 13 via another lens 122. In the transmission-type optical encoder, the light source 11 and the photodiode array 13 may not be arranged in the same encapsulation, but are respectively arranged at two opposite sides of the code disk 20.

It should be mentioned that although FIG. 1 shows that the lenses 121 and 122 are separated from the sensing chip 10, it is only intended to illustrate but not to limit the present disclosure. In other aspects, the lenses 121 and/or 122 are arranged inside the sensing chip 10 to adjust (e.g., directing and zooming) the light path.

Figure 2:
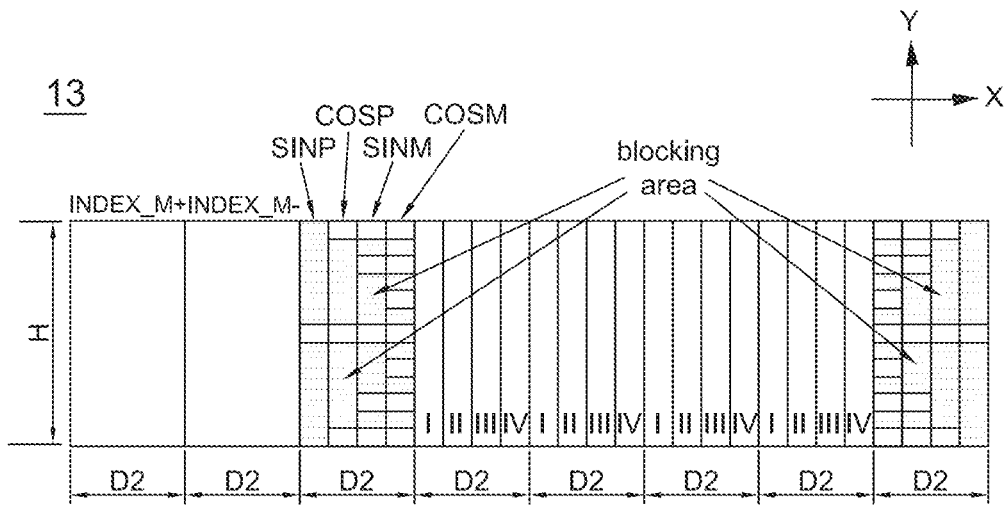
FIG. 2 is a schematic diagram of a photodiode array and code slits of an optical encoder according to one embodiment of the present disclosure.
Figure 2:
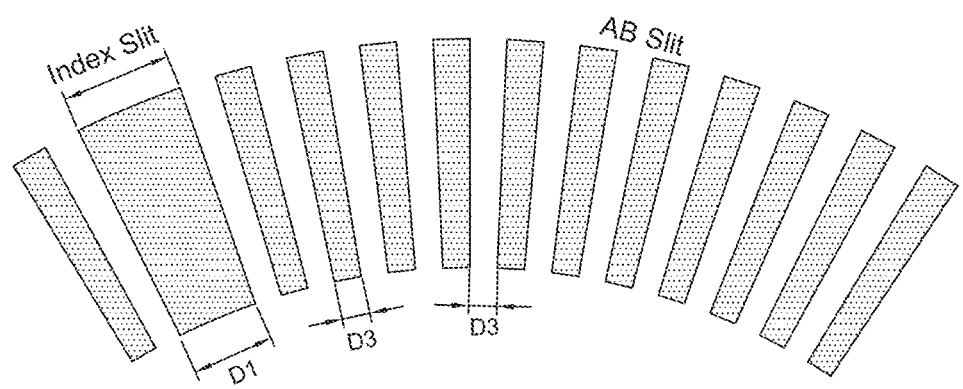

Please referring to FIG. 2, it is a schematic diagram of a photodiode array 13 and code slits of an optical encoder 100 according to one embodiment of the present disclosure. It should be mentioned that FIG. 2 shows some code slits formed on the code disk 20 for illustration purposes, in different aspects there are formed a circle of code slits on the code disk 20 including a plurality of position slits (shown as AB slit) and at least one index slit. The index slit is used to indicate an initial angle, a final angle or a specific angle.

The photodiode array 13 includes at least three sets of position photodiodes (e.g., FIG. 1 showing 6 sets, but not limited to) adjacently arranged to one another along a first direction (e.g., X-direction). Each set of position photodiodes has a first photodiode I, a second photodiode II, a third photodiode III and a fourth photodiode IV sequentially arranged along the first direction. The at least three sets of position photodiodes include a first set of position photodiodes (e.g., the most left set) and a last set of position photodiodes (e.g., the most right set) respectively arranged at two ends of the at least three sets of position photodiodes. In the present disclosure, the first direction is, for example, an arranging direction of the plurality of photodiodes or a tangential direction of the code disk 20.

Figure 3:
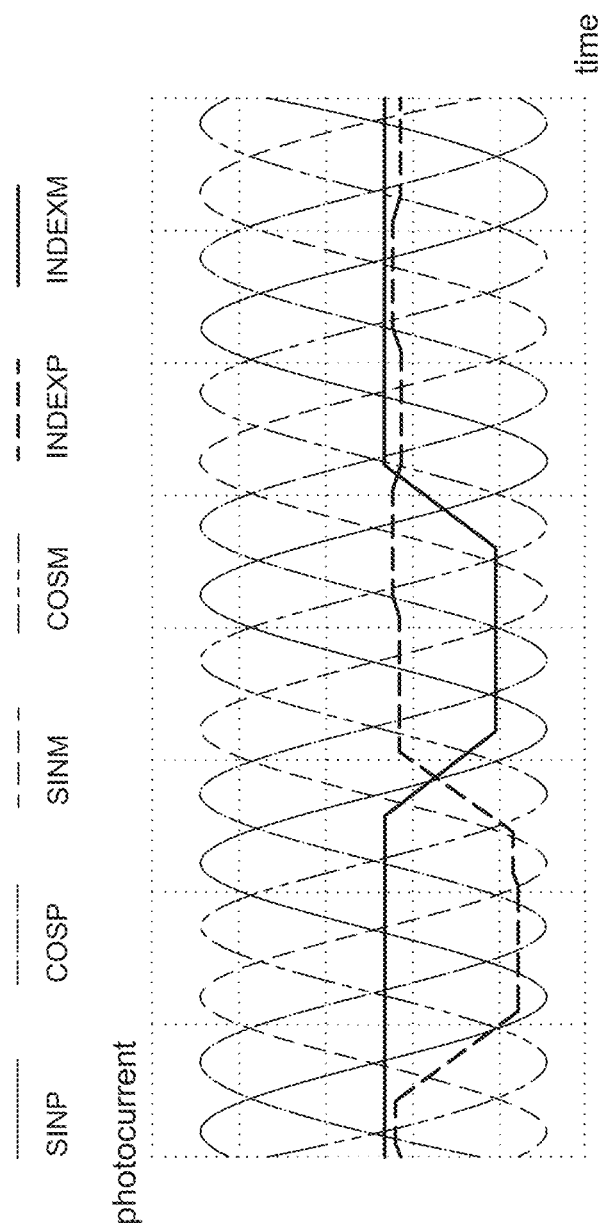
FIG. 3 is a schematic diagram of output currents of photodiodes of an optical encoder according to one embodiment of the present disclosure.

Referring to FIGS. 1 and 3, FIG. 3 is a schematic diagram of output currents of every photodiode of an optical encoder 100 according to one embodiment of the present disclosure. In this embodiment, output currents of the first photodiode I and the second photodiode II are phase quadrature, e.g., the first photodiode I generates a signal A+ in FIG. 1 which is shown as SINP in FIG. 3; and the second photodiode II generates a signal B+ in FIG. 1 which is shown as COSP in FIG. 3. Output currents of the first photodiode I and the third photodiode III are out of phase, e.g., the third photodiode III generates a signal A− in FIG. 1 which is shown as SINM in FIG. 3. Output currents of the second photodiode II and the fourth photodiode IV are out of phase, e.g., the fourth photodiode IV generates a signal B− in FIG. 1 which is shown as COSM in FIG. 3. It should be mentioned that the photocurrent may be a ramp signal and is not limited to the sinusoidal signal shown in FIG. 3.

The optical encoder 100 further includes a signal processing circuit 15 for generating two channel signals CHA and CHB, according to the signals A+, A−, B+ and B−, to be provided to a downstream circuit (e.g., a processor) for identifying a rotation angle of the code disk 20. The method of generating the two channel signals CHA and CHB is known to the art and not a main objective of the present disclosure, and thus details thereof are not described herein.

In this embodiment, the first photodiode I, the second photodiode II, the third photodiode III and the fourth photodiode IV of the at least three sets of position photodiodes have a same first width (D2/4) along the first direction, and have a same height H along a second direction (e.g., Y-direction in FIG. 2) perpendicular to the first direction.

More specifically, each of the position photodiodes have an identical sensing area (or referred to active area).

In this embodiment, the photodiode array 13 further includes two index photodiodes adjacently arranged at one of two ends of the at least three sets of position photodiodes, e.g., a first index photodiode INDEX_M− being adjacently arranged at one of two ends, e.g., left end in FIG. 2, of the at least three sets of position photodiodes along the first direction to generate a signal I− in FIG. 1 which is shown as INDEXM in FIG. 3. A second index photodiode INDEX_M+ is arranged adjacent to the first index photodiode INDEX_M− in the first direction, e.g., left end in FIG. 2, to generate a signal I+ in FIG. 1 which is shown as INDEXP in FIG. 3. The signal processing circuit 15 is further used to generate a channel signal CHI according to the signals I+ and I−, e.g., calculating a differential operation thereof, but not limited thereto.

It is appreciated that when the first index photodiode INDEX_M− is adjacently arranged at a right end of the at least three sets of position photodiodes, the second index photodiode INDEX_M+ is adjacently arranged at a right end of the first index photodiode INDEX_M−. In the present disclosure, all photodiodes are arranged in the same track to reduce the occupied area of the photodiode array 13 and simplify the manufacturing process.

In the present disclosure, a second width (e.g., D2) of each of the two index photodiodes INDEX_M− and INDEX_M+ along the first direction is larger than the first width (e.g., D2/4) of the position photodiodes (e.g., first photodiode I to the fourth photodiode IV). e.g., the second width is larger than or equal to 4 times of the first width. By comparing output currents INDEXM and INDEXP of the two index photodiodes INDEX_M− and INDEX_M+(illustrated below using an example), it is able to confirm an absolute or reference angle of the code disk 20.

Corresponding to the position photodiodes and the index photodiodes, the code slits of the code disk 20 include a plurality of position slits (shown as AB slit) and at least one index slit. A width of the index slit is larger than that of the position slits. In one aspect, the code slits form dark regions (e.g., non-reflective regions or non-transmissive regions), and spaces between the code slits form bright regions (e.g., reflective regions or transmissive regions). In another aspect, the code slits form bright regions, but spaces between the code slits form dark regions according to different applications.

In one non-limiting aspect, a slit width and a slit pitch (i.e., a distance between adjacent slits) D3 of the position slits are equal to 2 times of the first width of the position photodiodes, e.g., D3=(D2/2); whereas, a slit width D1 of the index slit is equal to 1.5 times of the second width of the index photodiodes, e.g., D1=(1.5×D2).

In other aspects, no matter whether the slit width D3 of the position slits is 2 times of the first width of the position photodiodes or not, an optical image profile of the position slits projected (reflected light or transmissive light depending on a type of the encoder) onto the photodiode array 13 is arranged to be 2 times of the first width of the position photodiodes. Or, no matter whether the slit width D1 of the index slit is 1.5 times of the second width of the index photodiodes or not, an optical image profile of the index slit projected (reflected light or transmissive light depending on a type of the encoder) onto the photodiode array 13 is arranged to be 1.5 times of the second width of the index photodiodes. In this embodiment, a size of the optical image profile is determined by the magnification of the lenses 121 and 122 as well as relative distances between components.

Preferably, the optical image profile projected onto the photodiode array 13 from the code slits matches the size of photodiodes.

During operation, when the index slit passes over the position photodiodes, total harmonic distortion is induced, especially the position photodiodes at two ends contributing the most to the total harmonic distortion. Accordingly, the present disclosure further provides an opaque layer, which blocks light spectrum emitted by the light source 11, to cover upon the first set of position photodiodes and the last set of position photodiodes. As the blocking area shown in FIG. 2, a coverage of the first photodiode I, the second photodiode II, the third photodiode III and the fourth photodiode IV of the first set of position photodiodes (e.g., the most-left set in FIG. 2) by the opaque layer is sequentially decreased; whereas, a coverage of the first photodiode I, the second photodiode II, the third photodiode III and the fourth photodiode IV of the last set of position photodiodes (e.g., the most-right set in FIG. 2) by the opaque layer is sequentially increased.

In one non-limiting embodiment, the coverage of the first photodiode I, the second photodiode II, the third photodiode III and the fourth photodiode IV of the first set of position photodiodes by the opaque layer is respectively 85%-95%, 65%-75%, 45%-55% and 25%-35%; whereas, the coverage of the first photodiode I, the second photodiode II, the third photodiode III and the fourth photodiode IV of the last set of position photodiodes by the opaque layer is respectively 25%-35%, 45%-55%, 65%-75% and 85%-95%.

In addition, the optical image profile projected from the position slits (shown as AB slit) and the index slit to the photodiode array 13 via the optics (e.g., including lenses 121 and/or 122 arranged between the code disk 20 and the photodiode array 13 in FIG. 1) may be expanded or shrunk (e.g., the magnification being larger or smaller than 1) such that the optical image profile does not match the position photodiodes and index photodiodes to cause photocurrents from the position photodiodes to have a crosstalk with photocurrents from the index photodiodes. As mentioned above, the projection herein is referred to transmission or reflection.

Figure 4A:
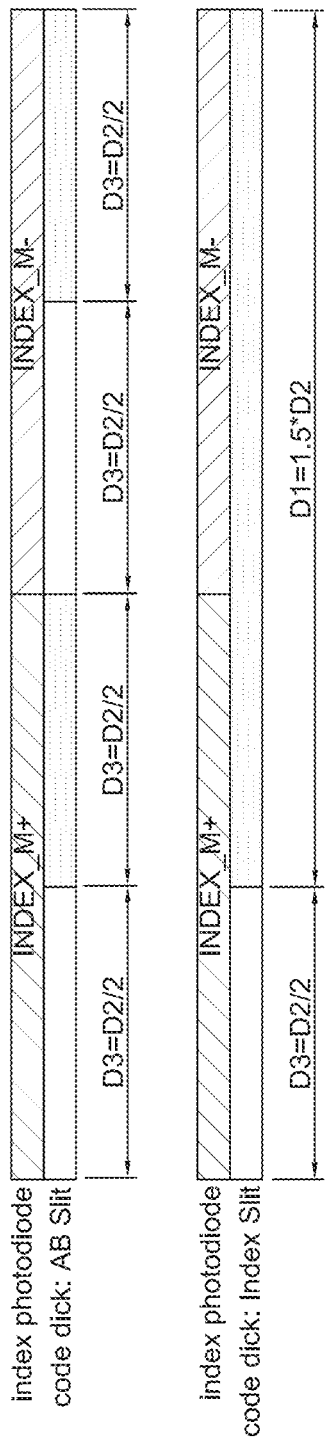
FIG. 4A is a schematic diagram of dimensions between index photodiodes and code slits of an optical encoder according to one embodiment of the present disclosure.
Figure 4B:
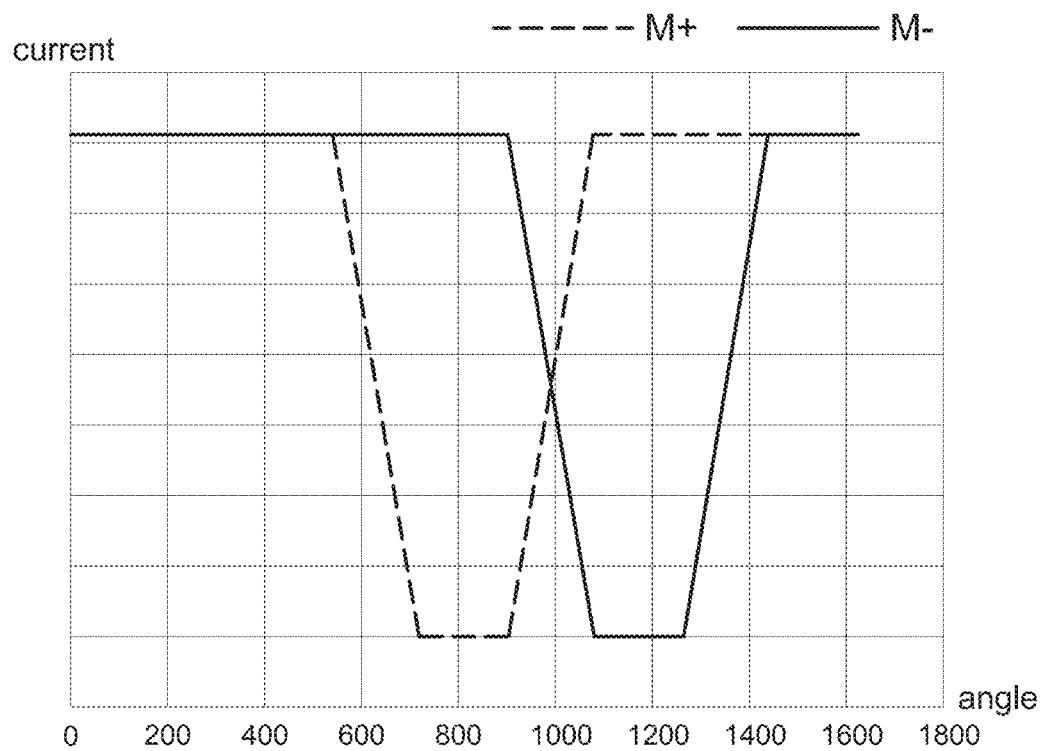
FIG. 4B is a schematic diagram of output currents of index photodiodes and a differential thereof of an optical encoder according to one embodiment of the present disclosure.

Referring to FIGS. 4A-4B, if the optical image profile just matches the size of photodiode array 13, e.g., the optical image profile of the position slit and the slit pitch (shown as D3) equal to 2 times of the first width (e.g., D2/4) of the position photoxiodes, and the optical image profile of the index slit (shown as D1) equal to 1.5 times of the second width of the index photodiodes, a single index output is generated as shown in FIG. 4B, e.g., obtained by subtracting output photocurrent M− of the first index photodiode INDEX_M− from output photocurrent M+ of the second index photodiode INDEX_M+(or calculated inversely). In this way, it is able to obtain a correct reference position or angle.

In FIG. 4A, if the magnification of the optics is just equal to 1, it means that a width of the position slits and the slit pitches is equal to 2 times of the first width of the position photodiodes, and a width of the index slit is equal to 1.5 times of the second width of the index photodiodes.

Figure 5:
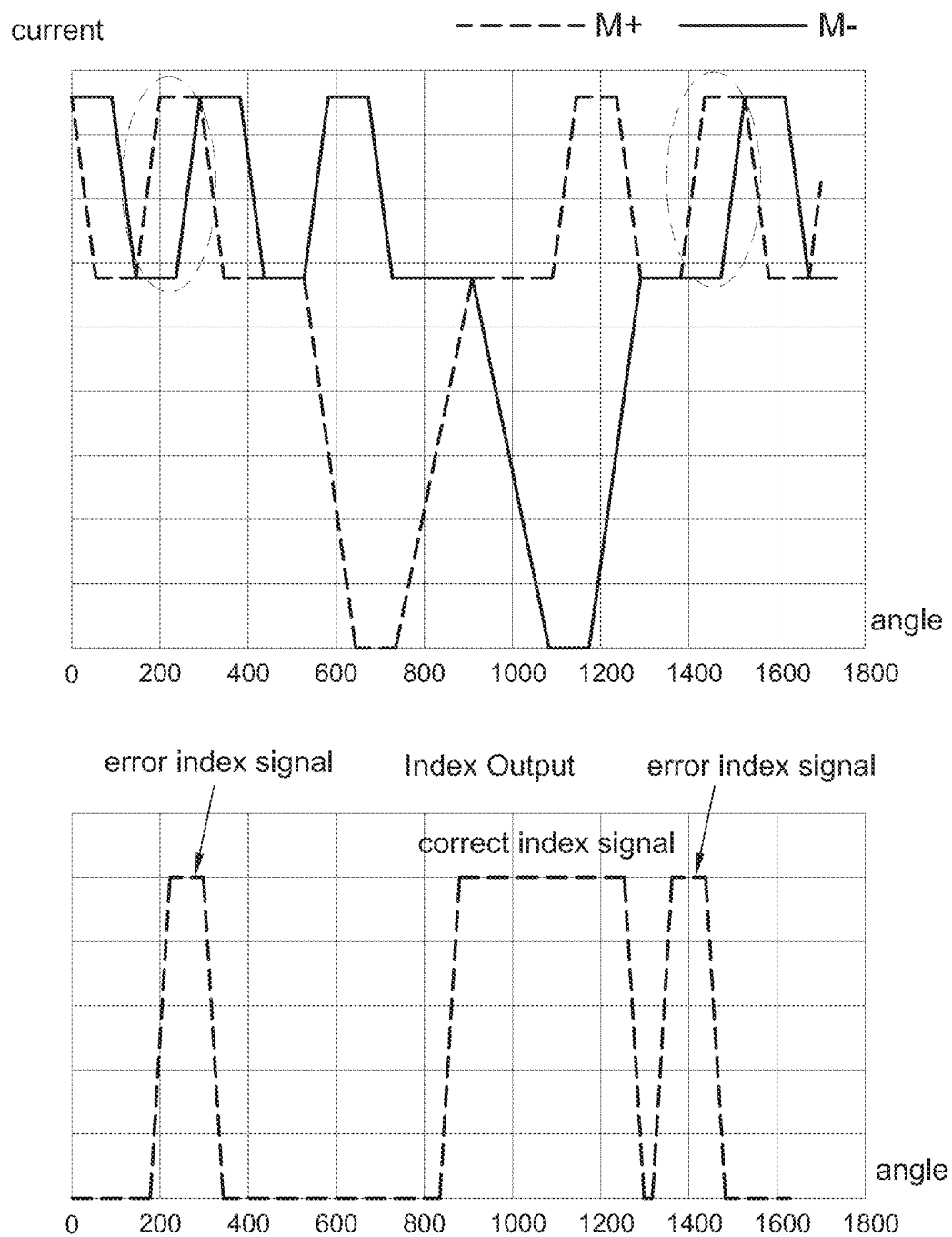
FIG. 5 is a schematic diagram of output currents of index photodiodes and a differential thereof of an optical encoder according to one embodiment of the present disclosure when the optical image profile is smaller than photodiodes.
Figure 8:
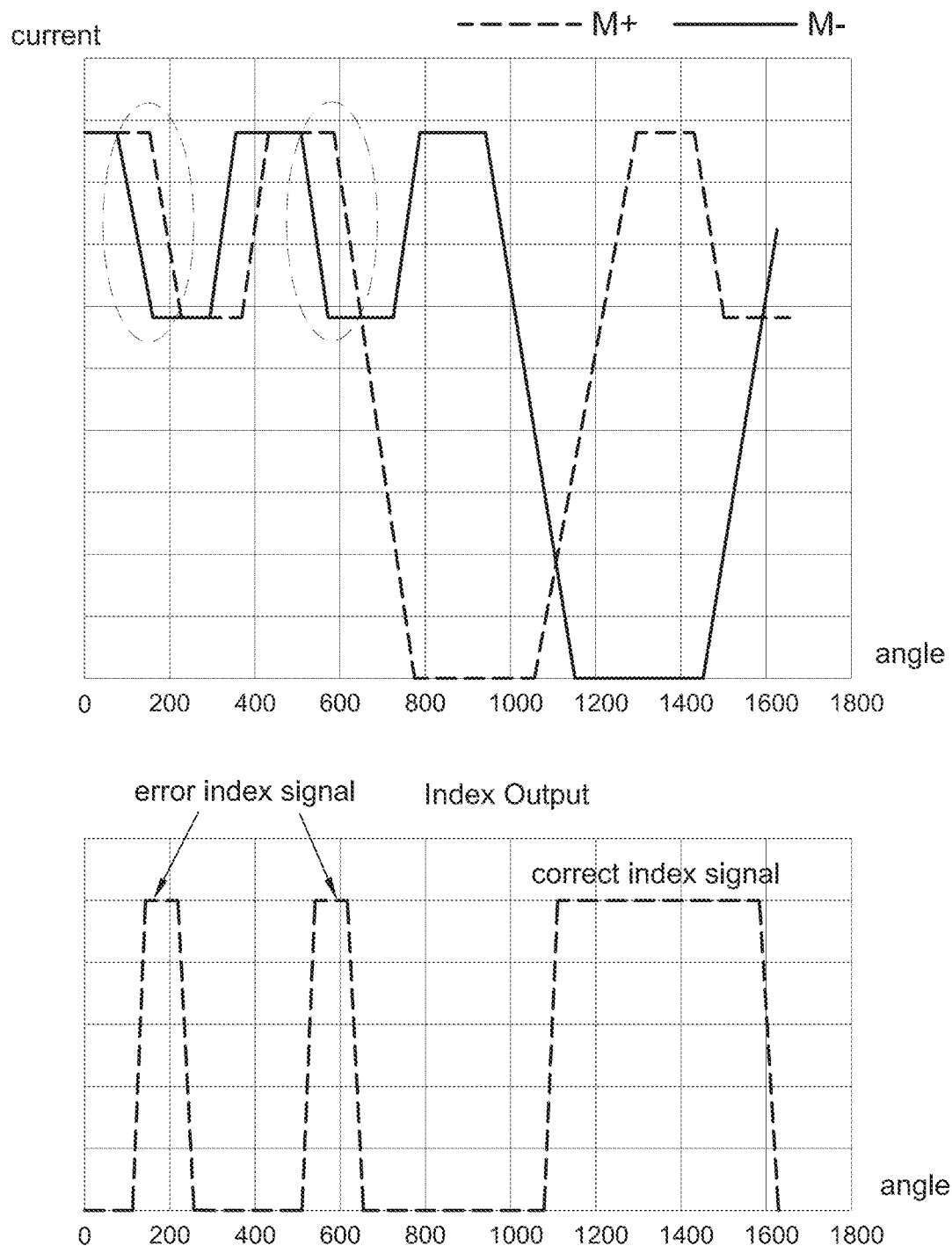
FIG. 8 is a schematic diagram of output currents of index photodiodes and a differential thereof of an optical encoder according to one embodiment of the present disclosure when the optical image profile is larger than photodiodes.

However, when the optical image profile does not equal to a size of the photodiode array 13, crosstalk is induced as shown in FIGS. 5 and 8 for example. In the present disclosure, an opaque layer (e.g., formed together with the opaque layer upon the position photodiodes) is provided to partially cover upon the second index photodiode INDEX_M+ and extend from one of two edge, in the first direction to a center thereof to eliminate the crosstalk between photocurrents.

Figure 6:
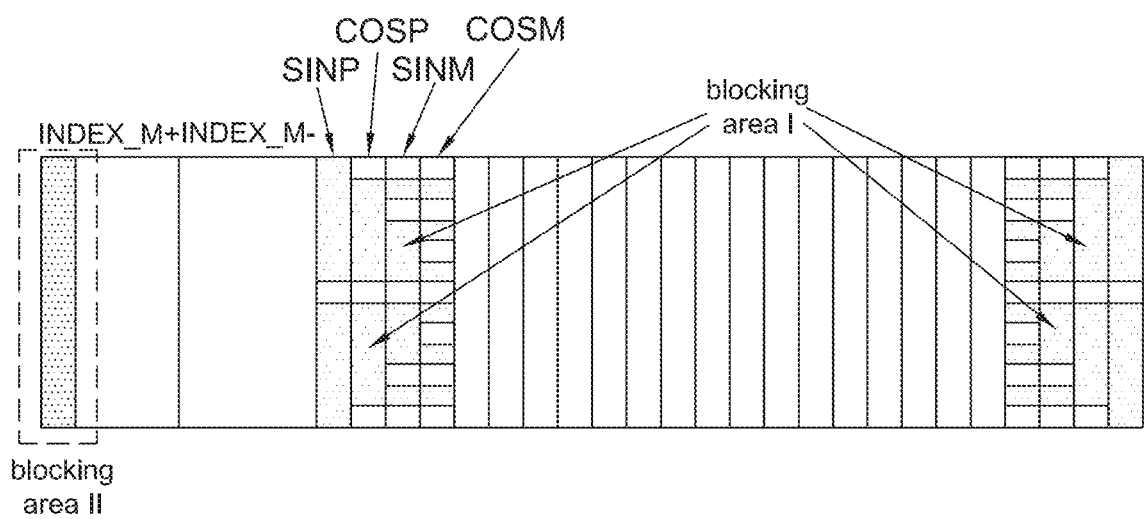
FIG. 6 is a schematic diagram of a photodiode array of an optical encoder according to another embodiment of the present disclosure.
Figure 7:
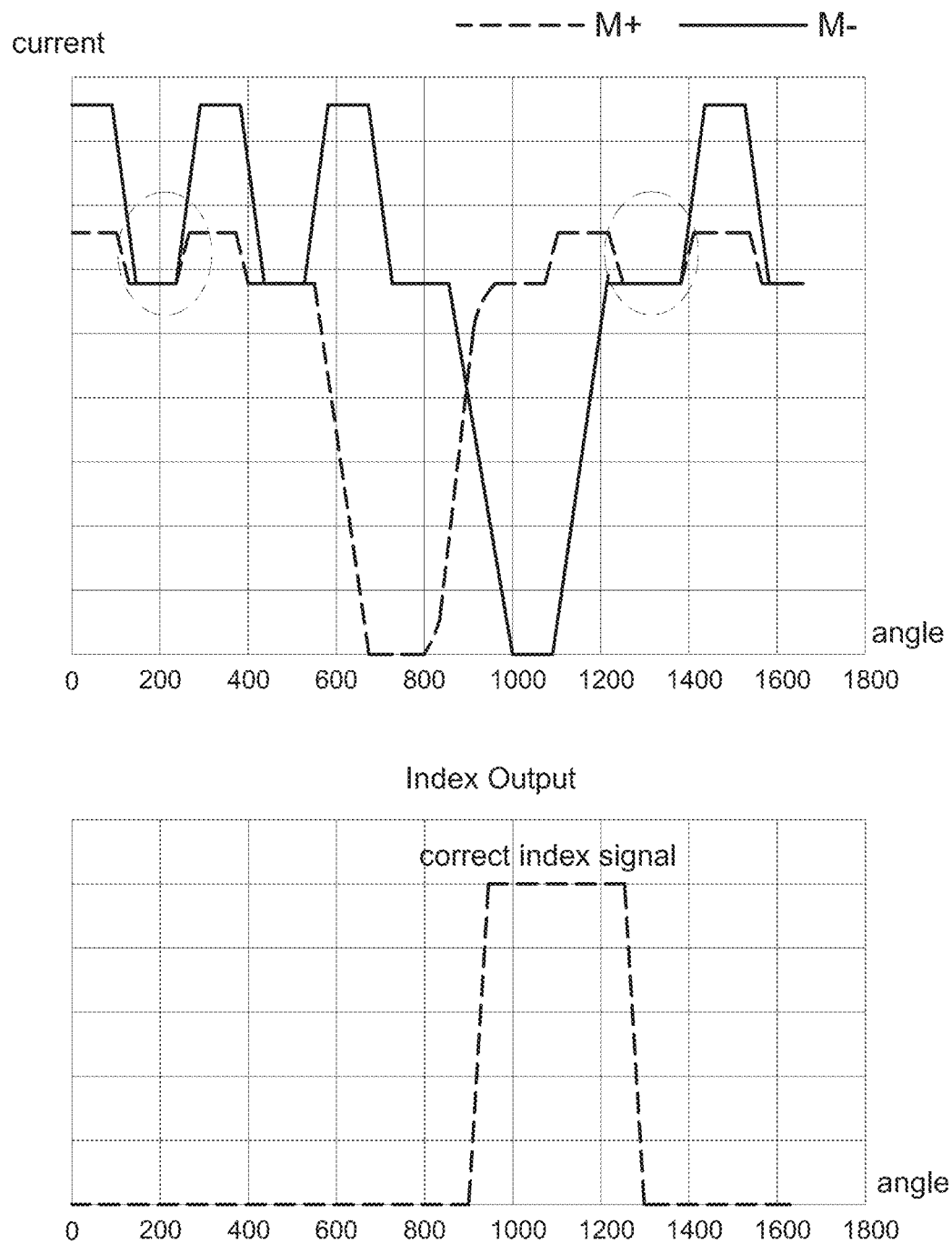
FIG. 7 is a schematic diagram of eliminating error index signals using the optical encoder configuration of FIG. 6.

For example, FIG. 5 shows the crosstalk when the optical image profile is smaller than the size of the photodiode array 13. Said smaller is referred to that the optical image profile of the position slits and the slit pitches D3 is smaller than 2 times of the first width of the position photodiodes and/or the optical image profile of the index silt D1 is smaller than 1.5 times of the second width of the index photodiodes. FIG. 5 shows that two error index signals are obtained. In this case, the opaque layer is covered upon the second index photodiode INDEX_M+ extending from, in the first direction, an edge farther from the first index photodiode INDEX_M− to the center of the second index photodiode INDEX_M+ as shown in FIG. 6. By arranging this opaque layer at the left side, it is seen from FIG. 7 that the photocurrent M+ originally within dashed lines in FIG. 5 is suppressed to eliminate the error index signals.

Figure 9:
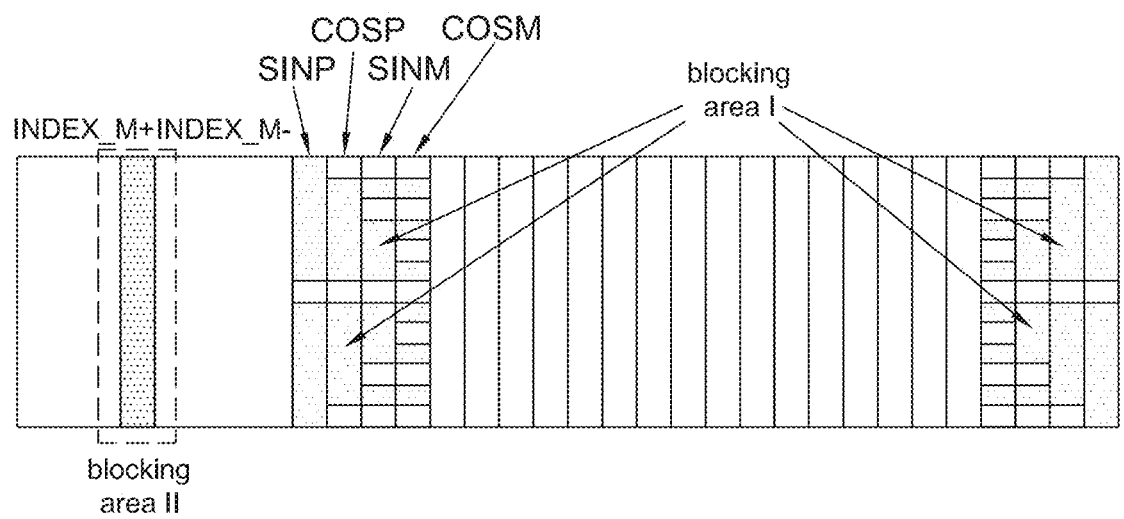
FIG. 9 is a schematic diagram of a photodiode array of an optical encoder according to an alternative embodiment of the present disclosure.
Figure 10:
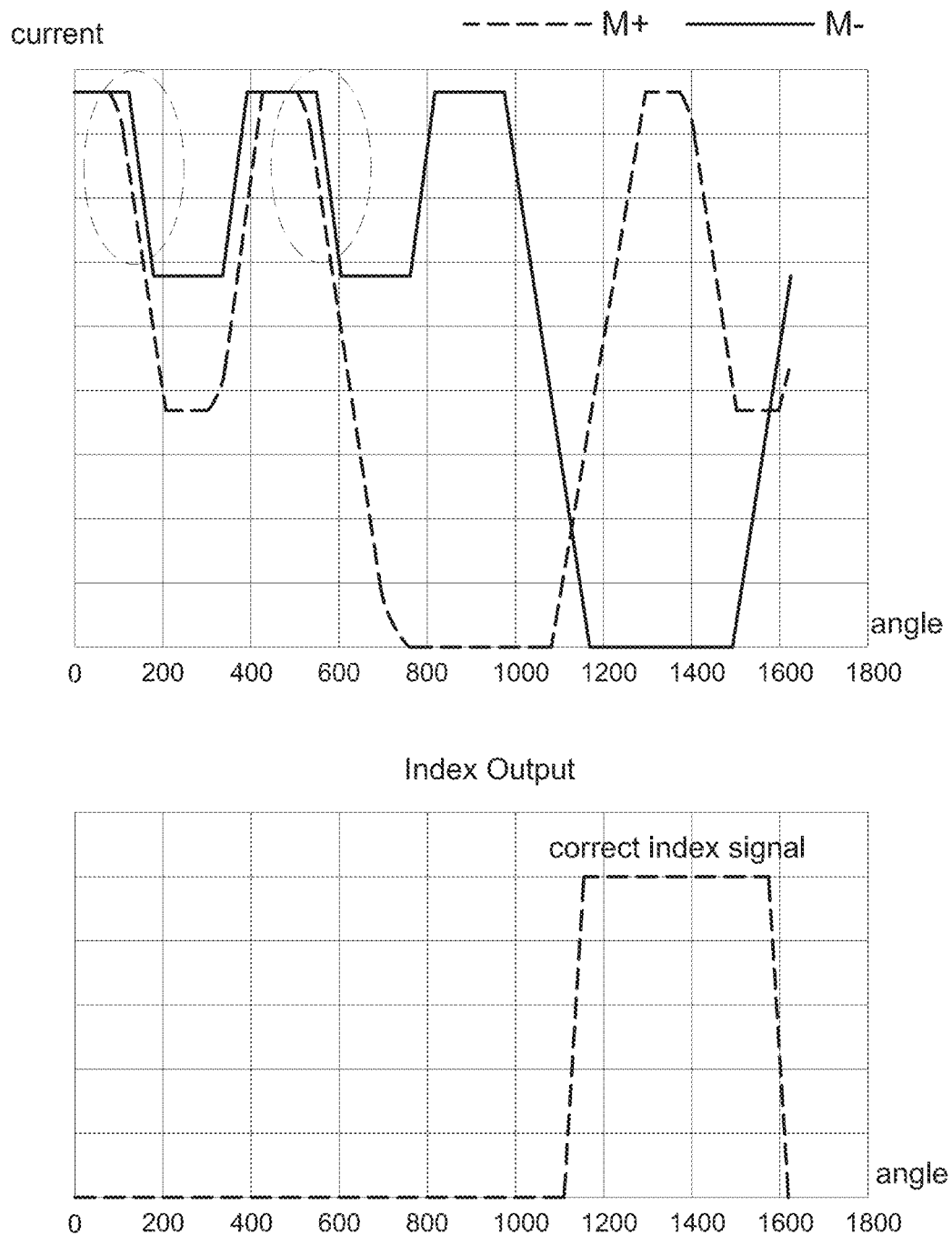
FIG. 10 is a schematic diagram of eliminating error index signals using the optical encoder configuration of FIG. 9.

For example, FIG. 8 shows the crosstalk when the optical image profile is larger than the size of the photodiode array 13. Said larger is referred to that the optical image profile of the position slits and the slit pitches D3 is larger than 2 times of the first width of the position photodiodes and/or the optical image profile of the index silt D1 is larger than 1.5 times of the second width of the index photodiodes. FIG. 8 shows that two error index signals are obtained. In this case, the opaque layer is covered upon the second index photodiode INDEX_M+ extending from, in the first direction, an edge adjacent to the first index photodiode INDEX_M− to the center of the second index photodiode INDEX_M+ as shown in FIG. 9. By arranging this opaque layer at the right side, it is seen from FIG. 10 that the photocurrent M+ originally within dashed lines in FIG. 8 is suppressed to eliminate the error index signals.

It should be mentioned that the above values of the magnification (e.g., 2 and 1.5 times) are only intended to illustrate but not to limit the present disclosure. When the optical image profile is larger or smaller than the size of photodiode array 13, it is able to eliminate the crosstalk by covering a part of the second index photodiode INDEX_M+.

In the present disclosure, when the difference between sizes of the optical image profile and the photodiode array 13 is larger, the coverage of the opaque layer (e.g., blocking area II in FIGS. 6 and 9) is larger, i.e. a sensing area or active area (one or more photodiodes being arranged therebelow) of the index photodiodes being covered more. In the present disclosure, the opaque layer does not block the first index photodiode INDEX_M− and the rest position photodiodes other than the first set of position photodiodes and the last set of position photodiodes (e.g., other than blocking area I in FIGS. 6 and 9) among the at least three sets of position photodiodes. The opaque layer is formed by such as sputtering or coating known to the art without particular limitations.

It should be mentioned that although the above embodiment is described in a way that a coverage of the first photodiode, the second photodiode, the third photodiode and the fourth photodiode of two sets of position photodiodes at two ends of the photodiode array is sequentially decreased or increased with a step change, the present disclosure is not limited thereto. In other embodiments, the coverage of the two sets of position photodiodes at two ends of the photodiode array is sequentially decreased or increased with a smooth change without a step change from one photodiode to another photodiode.

As mentioned above, when the index slit having a larger area passes over the position photodiodes, apparent total harmonic distortion is induced in output photocurrents. Meanwhile, if the size, shape, are and/or pitch of an optical image profile projected from the code slits onto the photodiode array do not match the photodiode array, the photocurrents of position photodiodes have a crosstalk with that of index photodiodes to generate error index signals (as shown in FIGS. 5 and 8). Accordingly, the present disclosure provides an optical encoder with partially covered position photodiodes at two ends (e.g., FIGS. 2, 6 and 9) to alleviate the total harmonic distortion and/or an optical encoder with a partially covered index photodiode (e.g., FIGS. 6 and 9) to eliminate error index signals.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical encoder, comprising:
   a photodiode array, comprising at least three sets of position photodiodes arranged adjacently to one another along a first direction, each set of position photodiodes having a first photodiode, a second photodiode, a third photodiode and a fourth photodiode arranged sequentially along the first direction, and the at least three sets of position photodiodes comprising a first set of position photodiodes and a last set of position photodiodes respectively at two ends of the at least three sets of position photodiodes; and
   an opaque layer covering upon the first set of position photodiodes and the last set of position photodiodes, wherein
   a coverage of the first photodiode, the second photodiode, the third photodiode and the fourth photodiode of the first set of position photodiodes by the opaque layer is sequentially decreased, and
   a coverage of the first photodiode, the second photodiode, the third photodiode and the fourth photodiode of the last set of position photodiodes by the opaque layer is sequentially increased, wherein
   output currents of the first photodiode and the second photodiode are phase quadrature;
   output currents of the first photodiode and the third photodiode are out of phase; and
   output currents of the second photodiode and the fourth photodiode are out of phase.

2. The optical encoder as claimed in claim 1, wherein
   the coverage of the first photodiode, the second photodiode, the third photodiode and the fourth photodiode of the first set of position photodiodes by the opaque layer is respectively 90%, 70%, 50% and 30%; and
   the coverage of the first photodiode, the second photodiode, the third photodiode and the fourth photodiode of the last set of position photodiodes by the opaque layer is respectively 30%, 50%, 70% and 90%.

3. The optical encoder as claimed in claim 1, wherein the first photodiode, the second photodiode, the third photodiode and the fourth photodiode of the at least three sets of position photodiodes have a first width along the first direction, and have a same height along a second direction perpendicular to the first direction.

4. The optical encoder as claimed in claim 3, wherein
   the photodiode array further comprises two index photodiodes adjacently arranged at one of the two ends of the at least three sets of position photodiodes, and
   a second width of each of the two index photodiodes along the first direction is larger than the first width.

5. The optical encoder as claimed in claim 4, wherein the second width is larger than or equal to 4 times of the first width.

6. The optical encoder as claimed in claim 4, further comprising a code disk arranged corresponding to the photodiode array, wherein the code disk comprises:
   a plurality of position slits, a slit width and a slit pitch of the position slits are equal to 2 times of the first width; and
   an index slit, a slit width of the index slit is equal to 1.5 times of the second width.

7. An optical encoder, comprising:
   a photodiode array, comprising at least three sets of position photodiodes arranged adjacently to one another along a first direction, and each set of position photodiodes having a first photodiode, a second photodiode, a third photodiode and a fourth photodiode arranged sequentially along the first direction;
   a first index photodiode adjacently arranged at one of two ends of the at least three sets of position photodiodes along the first direction;
   a second index photodiode arranged adjacent to the first index photodiode in the first direction; and
   an opaque layer partially covering upon the second index photodiode and extending from one of two edges in the first direction to a center thereof, wherein
   the first photodiode, the second photodiode, the third photodiode and the fourth photodiode of the at least three sets of position photodiodes have a first width along the first direction, and have a same height along a second direction perpendicular to the first direction; and
   a second width of each of the first and second index photodiodes along the first direction is larger than or equal to 4 times of the first width.

8. The optical encoder as claimed in claim 7, further comprising:
   a code disk, arranged corresponding to the photodiode array, and comprising a plurality of position slits and at least one index slit; and
   an optics, arranged between the code disk and the photodiode array, and configured to adjust an optical image profile projected from the position slits and the index slit to the photodiode array.

9. The optical encoder as claimed in claim 8, wherein when the optical image profile of the position slits is smaller than 2 times of the first width or the optical image profile of the index silt is smaller than 1.5 times of the second width, the opaque layer partially covers upon the second index photodiode extending from an edge farther from the first index photodiode to the center thereof.

10. The optical encoder as claimed in claim 8, wherein when the optical image profile of the position slits is larger than 2 times of the first width or the optical image profile of the index silt is larger than 1.5 times of the second width, the opaque layer partially covers upon the second index photodiode extending from an edge adjacent to the first index photodiode to the center thereof.

11. The optical encoder as claimed in claim 8, wherein when a size difference between the optical image profile and the photodiode array is larger, a coverage of the opaque layer is larger.

12. An optical encoder, comprising:
   a photodiode array, comprising at least three sets of position photodiodes arranged adjacently to one another along a first direction, each set of position photodiodes having a first photodiode, a second photodiode, a third photodiode and a fourth photodiode arranged sequentially along the first direction, and the at least three sets of position photodiodes comprising a first set of position photodiodes and a last set of position photodiodes respectively at two ends of the at least three sets of position photodiodes;
   a first index photodiode adjacently arranged at one of the two ends of the at least three sets of position photodiodes along the first direction;
   a second index photodiode arranged adjacent to the first index photodiode in the first direction; and
   an opaque layer covering upon the first set of position photodiodes and the last set of position photodiodes, and partially covering upon the second index photodiode and extending from one of two edges in the first direction to a center thereof, wherein
   a coverage of the first photodiode, the second photodiode, the third photodiode and the fourth photodiode of the first set of position photodiodes by the opaque layer is sequentially decreased, and
   a coverage of the first photodiode, the second photodiode, the third photodiode and the fourth photodiode of the last set of position photodiodes by the opaque layer is sequentially increased, wherein
   output currents of the first photodiode and the second photodiode are phase quadrature;
   output currents of the first photodiode and the third photodiode are out of phase; and
   output currents of the second photodiode and the fourth photodiode are out of phase.

13. The optical encoder as claimed in claim 12, wherein
   the coverage of the first photodiode, the second photodiode, the third photodiode and the fourth photodiode of the first set of position photodiodes by the opaque layer is respectively 90%, 70%, 50% and 30%; and
   the coverage of the first photodiode, the second photodiode, the third photodiode and the fourth photodiode of the last set of position photodiodes by the opaque layer is respectively 30%, 50%, 70% and 90%.

14. The optical encoder as claimed in claim 12, wherein
   the first photodiode, the second photodiode, the third photodiode and the fourth photodiode of the at least three sets of position photodiodes have a first width along the first direction, and have a same height along a second direction perpendicular to the first direction; and
   a second width of each of the first and second index photodiodes along the first direction is larger than the first width.

15. The optical encoder as claimed in claim 14, further comprising:
   a code disk, arranged corresponding to the photodiode array, and comprising a plurality of position slits and at least one index slit; and
   an optics, arranged between the code disk and the photodiode array, and configured to adjust an optical image profile projected from the position slits and the index slit to the photodiode array.

16. The optical encoder as claimed in claim 15, wherein
   when the optical image profile is smaller than the photodiode array, the opaque layer partially covers upon the second index photodiode extending from an edge farther from the first index photodiode to the center thereof; and
   when the optical image profile of the position slits is larger than the photodiode array, the opaque layer partially covers upon the second index photodiode extending from an edge adjacent to the first index photodiode to the center thereof.

17. An optical encoder, comprising:

a photodiode array, comprising a first set of photodiodes, a second set of photodiodes and a third set of photodiodes arranged adjacently to one another along a first direction, each set of photodiodes having a first photodiode, a second photodiode, a third photodiode and a fourth photodiode arranged along the first direction; and an opaque layer covering upon the first set of photodiodes and the third set of photodiodes, wherein a coverage of the first set of photodiodes by the opaque layer is sequentially decreased along the first direction, and a coverage of the third set of photodiodes by the opaque layer is sequentially increased along the first direction, wherein output currents of the first photodiode and the second photodiode are phase quadrature;

output currents of the first photodiode and the third photodiode are out of phase; and output currents of the second photodiode and the fourth photodiode are out of phase.

* * * * *